Sept. 16, 1952     P. E. HAWKINSON     2,610,357
TIRE TREADING MOLD
Filed March 19, 1948                              2 SHEETS—SHEET 2
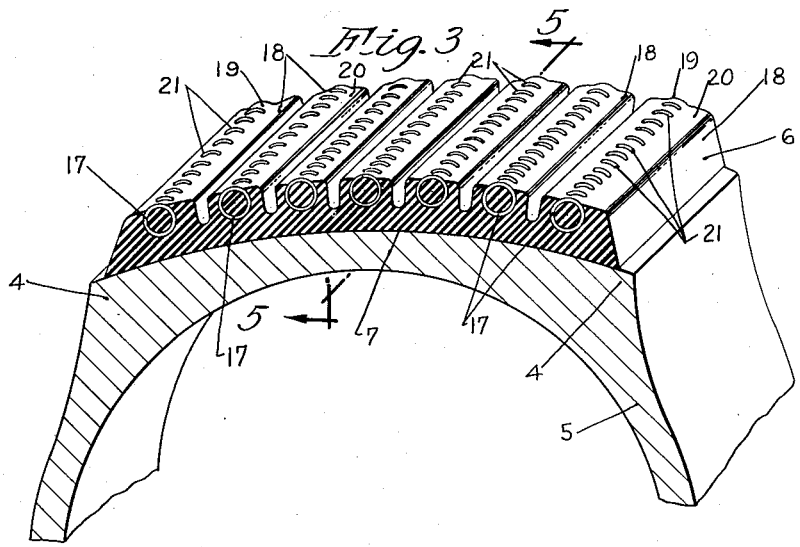
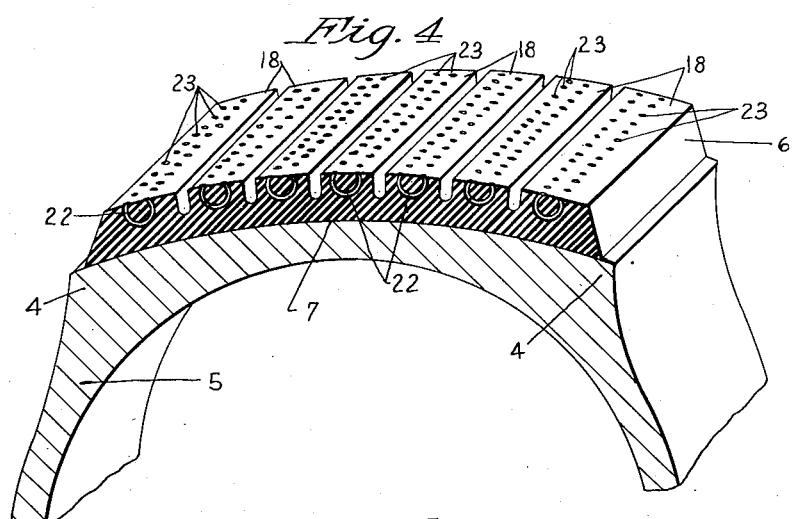
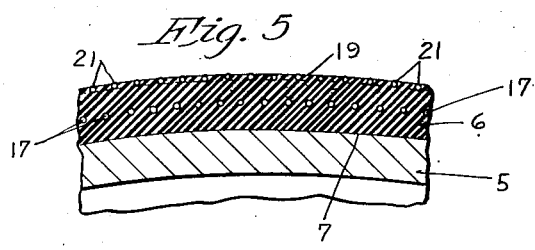
Inventor
Paul E. Hawkinson
By Attorneys
Merchant & Merchant Patented Sept. 16, 1952

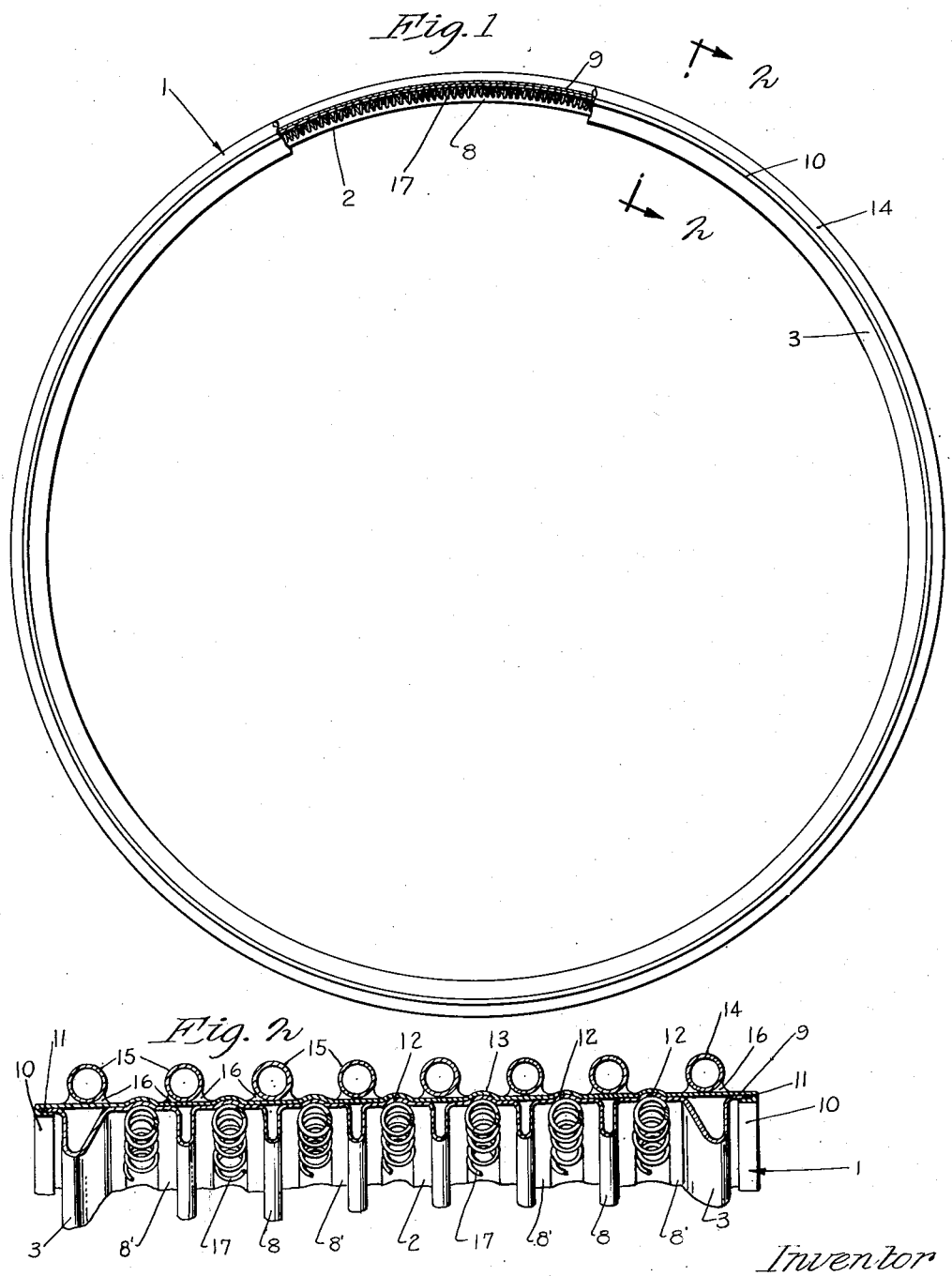

2,610,357

UNITED STATES PATENT OFFICE 2,610,357

TIRE TREADING MOLD

Paul E. Hawkinson, Minneapolis, Minn., assignor to Paul E. Hawkinson Company, Minneapolis, Minn., a corporation of Minnesota Application March 19, 1948, Serial No. 15,792

2 Claims. (Cl. 18—18)

My invention relates to the art of applying treads to pneumatic tires and, more specifically, to treads having imbedded therein coils of wire, for the purpose of imparting to the tread additional traction, and a novel mold construction for centering and positioning the coils of wire during the molding operation.

I have found that coils of wire can be successfully imbedded in the tread of tires for the purpose of increasing the traction of the tread on slippery surfaces. Particularly is this true with the treading process disclosed in my patent Re. 21,956 and with the retreading molds illustrated in my Patents 1,917,261 and 2,339,696, with which method and apparatus the treads are applied to the tire at a reduced or "rolling radius" as distinguished from the long or inflated radius. However, I have found it extremely important in the imbedding of coils of wire in the tread that the coils be sufficiently centered within the circumferentially-extended rubber ribs in which they are imbedded that they do not work themselves out of the ribs laterally.

I have also found that, when the coils are imbedded within the ribs so that the radially outermost portions of the convolutions of the coils are either flush with or below the normal road-engaging surface of the tread when the tire is removed from the mold, then and in that event, the wire does not reach the point of maximum efficiency as a traction element until after the normal road-engaging surface of the tread has been worn down by considerable wear. This means that the most effective use of the coils is frequently not had until after the need for same has passed, because in cold weather when the streets are icy, the tread wear is negligible.

The primary object of my invention is the provision of a mold which will both center the coils of wire laterally with respect to the ribs within which they are imbedded and will at the same time cause a portion of each convolution of the wire to project radially outwardly from the normal road-engaging surface of the tread during the molding operation.

The above and still further objects of my invention will become apparent from the following detailed specification, appended claims, and attached drawings.

Referring to the drawings, wherein like characters indicate like parts throughout the several views:

Fig. 1 is a side elevation of a mold built in accordance with my invention, some parts being broken away;

Fig. 2 is a transverse section, taken on the line 2—2 of Fig. 1;

Fig. 3 is a fragmentary perspective view of a pneumatic tire having applied thereto a tread provided by the mold;

Fig. 4 is a view corresponding to Fig. 3, but illustrating a tread after some degree of wear; and Fig. 5 is a view in section on an enlarged scale, taken on the line 5—5 of Fig. 3.

Referring with greater particularity to the drawings, the numeral 1 indicated, in its entirety, a novel mold comprising an endless cylindrical sheet metal curing ring 2 corrugated to provide a pair of spaced confining flanges 3, one each adjacent the opposite edges of said curing ring. The ring 2 and the confining flanges 3 define broadly a generally U-shaped cavity in which the newly-applied tread material is confined during the treading operation. Preferably and as shown, the confining flanges 3 are adapted to rest upon opposite relatively thick shoulder portions 4 of a tire casing 5, whereby to confine the newly applied tread material 6 between the shoulders 4 on the worn or relatively thin crown portion 7 between the shoulders 4, all as more specifically taught in my earlier Patent Re. 21,956. Intermediate the confining flanges 3 are a plurality of tread-design-forming ribs 8 extending radially inwardly of the endless cylindrical sheet metal curing ring 2, which are preferably U-shaped in cross section and which define therebetween a plurality of tread design-forming channels 8'. To strengthen the curing ring 2, I provide an endless annular sheet metal reinforcing band 9 applied tightly over and embracing the outer surface of the curing ring 2 and having its opposite side edges crimped or bent, as indicated at 10, to embrace the opposite side edges 11 of the curing ring 2.

Intermediate the tread design-forming ribs 8 and preferably centrally thereof, I provide a radially outwardly-projecting circumferentially-extended annular recess 12, which is arcuate in cross section. It will be observed that the reinforcing band 9 is also provided with radially outwardly-projecting circumferentially extended channels 13 into which the recessed portion 12 of the curing ring 2 is nested.

For the purpose of applying heat to the curing ring 2, I provide a coiled tube 14 applied around the exterior of the clamping band 9, preferably and as shown, with each convolution 15 intermediate the laterally-spaced circumferentially-extended channel-shaped recesses 13. The coil 14 is made to adhere to the band 9 by means of soldering or the like, as indicated by the numeral 16. It is important to note that the positioning of the convolutions 15 of the heating coil 14 intermediate the channel-shaped recesses 13 facilitates confining the solder 16 to a channel intermediate the raised portions 13 and also greatly strengthens the convolutions 15 against lateral shifting movements caused by impact.

When the above-described novel treading mold is used for the purpose of inserting wire coils into the tread 6 of a pneumatic tire, the endless coils of wire, indicated by the numeral 17, are inserted in the channels 8' defined by the confining flanges 8, so that the most radially outer portion of each convolution of the coil is received within the annular recess 12. The coils 17 are thereby centered intermediate the ribs 8. It will be observed that the coils 17, preferably and as shown, are of a smaller diameter than the transverse width of the channels 8' (see Fig. 2). Due to the fact that the wire coils 17 are normally straight, their tendency to return to a straightened condition holds them within the channels 8' and within the recesses 12 when they are bent to form a complete circular loop, as indicated in Fig. 1. The casing 5 with the newly applied tread rubber 6 thereon is preferably placed within the curing ring 2 for curing, is cured, and then removed therefrom after curing, all as disclosed in my patent Re. 21,956. The result is that the new tread material 6 is formed with a plurality of endless circumferentially-extended parallel ribs 18 with the wire coils 17 imbedded therein, as indicated in Fig. 3. It will be observed that the coils 17 are of less width than the ribs 18 and are preferably centered therebetween so as to render it impossible for the individual convolutions of the coil to work out the sides of the ribs 18. It will also be observed that ridges of rubber 19 formed in the recesses 12 of the curing ring 2 extend radially outwardly beyond the normal road-engaging surface 20 of the ribs 18 and have the outermost portions 21 of each convolution of the wire coil 17 substantially flush with the radially outer surface thereof.

Such a tire has almost immediate traction, due to the fact that the radially outermost portion of each convolution of the coil 17, indicated by the numeral 21, has immediate contact with the road. However, the rubber ridges 19 and the portions 21 of the convolutions of the wire coil 17 soon are worn off or abraded away because of the small amount of contact with the road which they afford. The result is a tread which appears substantially as illustrated in Fig. 4, wherein the ridges 19 and the portions 21 of each convolution of the coil 17 have been worn down to a common level with the normal road-engaging surface 20 of the several ribs 18. It will be observed here that there is no longer a continuous coil 17, as indicated in Figs. 1, 2, and 3. All that remains is a plurality of helical segments 22 (see Fig. 4) which, from side elevation, have the appearance of a U-shaped staple, the points 23 of which are substantially flush with the now transversely smooth road-engaging surface 20 of the ribs 18. It should here be stated that wire coils give a maximum amount of traction when they are worn to points 23 which project substantially radially of the axis of the tire.

Therefore, with this new tread construction, not only does one get immediate results from the wire coils but, further and more important, the wire coils have reached their point of maximum efficiency as soon as the rubber channels or ridges 19 and the radially projected outer portions 21 of the coil 17 are worn to the normal road-engaging surface 20 of the ribs 18.

What I claim is:

1. An annular ring-type tire retreading mold comprising an inner endless annular sheet metal tread design forming and curing ring, said ring being provided with two series of corrugations, the corrugations of one series extending radially inwardly and the corrugations of the other series extending radially outwardly with the corrugations of both series equally spaced transversely of the ring, and the corrugations of said other series being disposed intermediate those of said one series and providing wire coil receiving grooves, an outer endless annular sheet metal reenforcing band engaging the outer surface of said curing ring and being provided with a transverse series of equally spaced radially outwardly projecting corrugations receiving and embracing the wire coil receiving corrugations of the curing ring, and a steam conducting coil disposed around and connected to the outer surface of the reinforcing band, the convolutions of the coil being disposed intermediate the outwardly projecting corrugations in the curing ring and reinforcing band and immediately above the inwardly projecting corrugations in the curing ring.

2. An annular ring-type retreading mold comprising outer and inner sheet metal rings rigidly connected together transversely thereof, the outer ring having a transverse series of uniformly spaced annular corrugations projecting radially outwardly from the peripheral surface thereof, a heating coil secured to the annular peripheral surface of the outer ring with the convolutions thereof disposed intermediate the corrugations in the outer ring; said inner ring engaging the inner annular surface of said outer ring and having a transverse series of annular design forming and tread curing corrugations projecting inwardly from the inner surface thereof and disposed in radial alignment with said heating convolutions, a second transverse series of annular corrugations in said inner ring midway between the design forming corrugations and extending radially outwardly from said ring into interlocking engagement with the inner surface of said corrugations of said outer ring, and said last mentioned series of corrugations providing wire coil positioning grooves in said inner ring.

PAUL E. HAWKINSON.

REFERENCES CITED

The following references are of record in the file of this patent:

UNITED STATES PATENTS

| Number | Name | Date |
| --- | --- | --- |
| 1,740,616 | Midgley | Dec. 24, 1929 |
| 2,155,906 | Ryhn | Apr. 25, 1931 |
| 2,006,038 | Yamaki | June 25, 1935 |
| 2,034,618 | Hawkinson | Mar. 17, 1936 |
| 2,339,696 | Hawkinson | Jan. 18, 1944 |